Patented May 12, 1931

1,805,444

UNITED STATES PATENT OFFICE

HENRY H. WILSON, OF REGINA, SASKATCHEWAN, CANADA, ASSIGNOR TO STANDARD OIL DEVELOPMENT COMPANY, A CORPORATION OF DELAWARE

DESULPHURIZING LIQUID HYDROCARBON

No Drawing. Application filed January 11, 1928, Serial No. 246,103, and in Canada January 31, 1927.

This invention relates to improvements in treating hydrocarbon oils for correcting corrosion and sourness due to the presence of elemental or combined sulphur. The invention is especially applicable to naphtha or gasoline containing both elemental sulphur and mercaptans and will be described for illustration in this connection. It will be understood, however, that the improved method has numerous other applications.

The gasoline to be treated, for example the Canadian casinghead gasoline known as Okotoks gasoline, containing 0.110% of sulphur, is brought into intimate contact with dry finely ground potassium hydroxide. A fineness of 20 to 100 mesh per square inch is suitable. The gasoline is preferably agitated with the potassium hydroxide, either in a vessel provided with a mechanical stirrer or in a mixing column, which may be made in one or several sections. The sulphur-containing alkali is allowed to settle out of the oil or is otherwise suitably removed. Alternatively the gasoline may be passed through a bed of the hydroxide.

The time of agitation will vary with the conditions, but it may be said that one to two hours of vigorous agitation is generally sufficient. The treatment may be carried on at atmospheric temperature, but is expedited by heating, which will of course be insufficient to vaporize substantial amounts of the oil being treated.

When treating gasoline of the kind referred to, one pound of anhydrous potassium hydroxide per barrel, (42 gals.) is added to put the oil in condition to pass all standard tests. The treated oil will usually give a sulphur determination of 0.065 or thereabout, and is "sweet", as indicated by the doctor or sodium plumbite test as applied both with and without the addition of elemental sulphur.

I have found that anhydrous potassium hydroxide has the property of correcting difficulties due to the presence, not only of corrosive sulphur (elemental sulphur and hydrogen sulphide), but also those due to sour sulphur (mercaptans and the like).

If the oil contains a high percentage of light mercaptans or hydrogen sulphide, it is economical to give the oil a preliminary wash with aqueous sodium hydroxide, which will fix the greater part of such sulphur as sodium sulphide. This will be dissolved in the water and removed with it. Care should be taken to free the oil from practically all water, as by careful stratification and withdrawal of the oil, since the potassium hydroxide used in the subsequent treating stage is most efficient when completely anhydrous. However, some of the advantages of the invention can be obtained even though small amounts of water be present.

The method described herein is advantageous in the treatment of cracked naphtha, especially when this is to be mixed with antiknock agents, such as lead tetraethyl.

The foregoing description is illustrative only, and various changes may be made within the scope of the appended claims, in which it is my intention to claim all novelty inherent in the invention as broadly as the prior art permits.

It is to be understood that the expression "sulphur-containing" in the claims, refers to hydrocarbons and petroleum oils, which contain corrosive sulphur (elemental sulphur and hydrogen sulphide) as determined by the copper strip or copper dish method, and/or sour sulphur (mercaptans and the like) as determined by the "doctor" test.

I claim:

1. In the treating of low boiling petroleum oils containing sulphur in one or more of the forms, elemental sulphur, hydrogen sulphide, and mercaptans, the improvement which comprises bringing the oils in liquid phase into intimate contact with potassium hydroxide in the substantial absence of water.

2. In the treating of low boiling petroleum oils containing sulphur in one or more of the forms, elemental sulphur, hydrogen sulphide, and mercaptans, the improvement which comprises bringing the oils in liquid phase into intimate contact with anhydrous potassium hydroxide in finely divided condition.

3. In the treating of low boiling petroleum oils containing sulphur in one or more of the forms, elemental sulphur, hydrogen sulphide, and mercaptans, the improvement which comprises correcting the adverse effect of such sulphur by bringing the oils in liquid phase into intimate contact with finely divided anhydrous potassium hydroxide, whereby at least the greater part of the sulphur is removed or made unobjectionable, and separating the treated oil.

4. In the treating of low boiling petroleum oils containing sulphur in one or more of the forms, elemental sulphur, hydrogen sulphide, and mercaptans, the improvement which comprises bringing the oils while liquid into intimate contact with potassium hydroxide in the substantial absence of water, and heating the mixture to a temperature insufficient to vaporize substantial amounts of said oils.

HENRY H. WILSON.